US011595476B2

(12) United States Patent
Rath

(10) Patent No.: US 11,595,476 B2
(45) Date of Patent: *Feb. 28, 2023

(54) SYSTEMS AND METHODS FOR DATA DISTRIBUTION USING A PUBLICATION SUBSCRIBER MODEL WITH A FEDERATION OF TRUSTED DATA DISTRIBUTION NETWORKS

(71) Applicant: AT&T Intellectual Property I, L.P., Atlanta, GA (US)

(72) Inventor: Christopher Rath, Hillsborough, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 381 days.

This patent is subject to a terminal disclaimer.

(21) Appl. No.: 16/513,383

(22) Filed: Jul. 16, 2019

(65) Prior Publication Data
US 2019/0342392 A1    Nov. 7, 2019

Related U.S. Application Data

(63) Continuation of application No. 15/435,675, filed on Feb. 17, 2017, now Pat. No. 10,397,327.

(51) Int. Cl.
*H04L 29/06*     (2006.01)
*H04L 67/1097*   (2022.01)
(Continued)

(52) U.S. Cl.
CPC .......... *H04L 67/1097* (2013.01); *H04L 63/04* (2013.01); *H04L 63/101* (2013.01);
(Continued)

(58) Field of Classification Search
CPC ............ H04L 63/0421; G06F 21/6263; G06Q 30/0269; H04W 12/02
(Continued)

(56) References Cited

U.S. PATENT DOCUMENTS 6,757,736 B1    6/2004   Hutchison et al.
7,860,882 B2    12/2010  Hinton et al.
(Continued)

FOREIGN PATENT DOCUMENTS

WO    WO 1999/026375 A2    5/1999

OTHER PUBLICATIONS

Hofman; "Federated Platforms For Seamless Interoperability In The Physical Internet"; 2nd Int'l Physical Internet Conference; Jul. 2015; 16 pages.
(Continued)

*Primary Examiner* — Evans Desrosiers
(74) *Attorney, Agent, or Firm* — Guntin & Gust, PLC; Matthew Tropper

(57) ABSTRACT

Federation of trusted data distribution systems is accomplished by treating an entire data distribution network as either a publisher or subscriber to a feed in another data distribution network. A first data feed is created in a first data feed management subsystem associated with a first data distribution network. A second data feed related to the first data feed is created in a second data feed management subsystem associated with a second data distribution network. A first data access policy is associated with the second data feed and a publisher for the second data feed is created in the second data distribution network. The identity and authentication of a second subscriber to the second data feed in the second data distribution network is managed by referencing the first data access policy.

20 Claims, 5 Drawing Sheets

(51) Int. Cl.
  *H04L 9/40* (2022.01)
  *H04L 65/1073* (2022.01)
  *H04L 67/06* (2022.01)
  *H04N 21/472* (2011.01)
  *H04L 67/55* (2022.01)

(52) U.S. Cl.
  CPC .......... *H04L 65/1073* (2013.01); *H04L 63/20* (2013.01); *H04L 67/06* (2013.01); *H04L 67/55* (2022.05); *H04N 21/472* (2013.01)

(58) Field of Classification Search
  USPC .......................................................... 726/27
  See application file for complete search history.

(56) References Cited

U.S. PATENT DOCUMENTS

| | | | |
|---|---|---|---|
| 7,930,711 B2 | 4/2011 | Pelkey et al. | |
| 8,024,771 B2 | 9/2011 | Malkin et al. | |
| 8,635,464 B2 | 1/2014 | Yacobi | |
| 8,726,330 B2 | 5/2014 | Nathan et al. | |
| 2004/0128531 A1 | 7/2004 | Rotholtz | |
| 2006/0173985 A1* | 8/2006 | Moore | H04L 67/00 707/E17.116 |
| 2006/0233322 A1* | 10/2006 | Allman | H04L 67/568 379/88.01 |
| 2009/0328177 A1* | 12/2009 | Frey | H04L 9/3213 726/9 |
| 2010/0017845 A1* | 1/2010 | Jones | G06F 21/33 726/1 |
| 2010/0332530 A1 | 12/2010 | McKelvie et al. | |
| 2013/0227636 A1* | 8/2013 | Bettini | H04W 12/12 726/1 |
| 2014/0033076 A1* | 1/2014 | Al-Alami | G06Q 10/10 715/753 |
| 2016/0154847 A1 | 6/2016 | Prasanna Kumar et al. | |
| 2016/0285576 A1 | 9/2016 | Kim et al. | |

OTHER PUBLICATIONS

Gioachin et al.; "Emergency Alerts as RSS Feeds with Interdomain Authorization"; IEEE $2^{nd}$ Int'l Conf. Internet Monitoring and Protection; 2007; 8 pages.

International Patent Application No. PCT/US2018/015659; Int'l Written Search Report and the Written Opinion; dated Apr. 10, 2018; 18 pages.

International Patent Application No. PCT/US2018/015659; Int'l Preliminary Report on Patentability; dated Aug. 29, 2019; 11 pages.

* cited by examiner

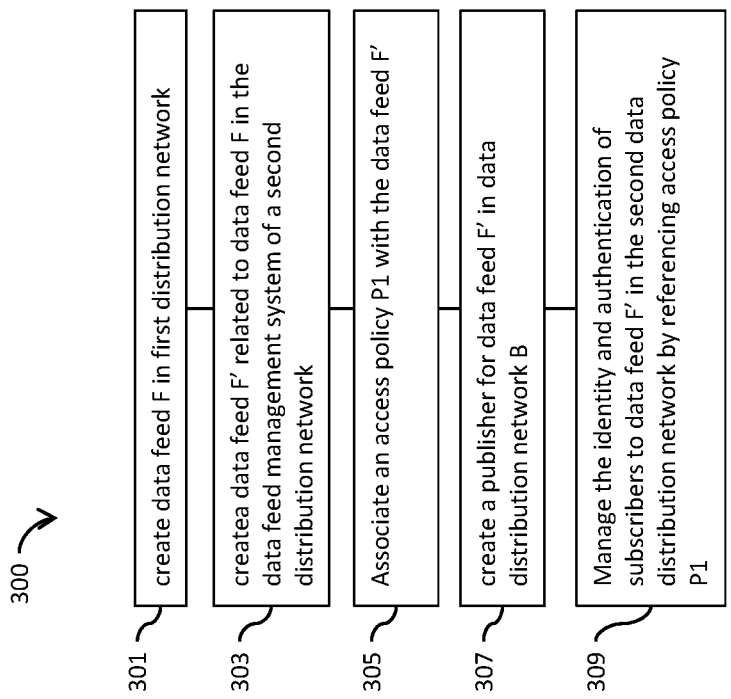

SYSTEMS AND METHODS FOR DATA DISTRIBUTION USING A PUBLICATION SUBSCRIBER MODEL WITH A FEDERATION OF TRUSTED DATA DISTRIBUTION NETWORKS

CROSS REFERENCE TO RELATED APPLICATIONS

This application is a continuation of, and claims priority to, U.S. patent application Ser. No. 15/435,675, filed Feb. 17, 2017, entitled "Systems and Methods for Data Distribution Using a Publication Subscriber Model with a Federation of Trusted Data Distribution Networks," the entire contents of which are hereby incorporated herein by reference.

TECHNICAL FIELD

The present invention relates to fields of data communication and data processing. More specifically, embodiments of the present invention are related to data publication, subscription, and/or distribution methods, apparatuses and/or systems.

BACKGROUND

The publication and subscription (pub-sub) model is widely used for data distribution where there are one or more sources for a particular data set and one or more users of that data set. Implementations of the pub-sub model usually provide an open publication model (no authentication of publishers or subscribers), and an authenticated model requiring publishers and subscribers to provide credentials. Management of the credentials is handled by the operator of the pub-sub network, usually through a pub-sub service that acts as both a subscription manager and a content distribution agent, and requires data subscribers to negotiate with data providers to gain access. Management of credentials is complicated when data providers and subscribers are in different administrative domains (different data distribution networks). In that situation, data subscribers in one domain must maintain distinct identities for each data distribution system and their associated pub-sub services. Additionally, the data movement infrastructure must have connectivity to each individual subscriber across administrative domain. In addition to coordinating credentials management, there may be network connectivity issues to be resolved as well. Current pub-sub model implementations require a single administrative domain for identity management and authentication. Typically such systems require a global repository of feed across all distribution networks.

Illustrated in FIG. 1 is a typical network environment 100 in which a plurality of publication-subscription (pub-sub) data distribution networks operate. Only three are shown in FIG. 1, namely data distribution network A 101, data distribution network B 103 and data distribution network C 105. Each data distribution network includes a pub-sub service for example, data distribution network a 101 includes pub-sub service 107, data distribution network B 103 includes pub-sub service 109, and data distribution network C 105 includes pub-sub service 111). Associated with each data distribution network are a plurality of subscribers and publishers. In the illustration of FIG. 1, three publishers and three subscribers are shown. Specifically, data distribution network A includes subscriber a 113, subscriber b 115, subscriber c 117, publisher a 119, publisher b 121 and publishers c 123. Similarly, data distribution network B includes subscriber a' 125, subscriber b' 127, subscribers c' 129, publisher a' 131, publisher b' 133, and publisher c' 135. Data distribution network C is shown is including subscriber a" 137, subscriber b" 139, subscribers c" 141, publisher a" 143, publisher b" 145, and publisher c" 147.

Publishers send structured content to one or more instances of the pub-sub service. The subscriber sends subscription requests to an instance of the pub-sub service and, subject to acceptance of a particular subscription request, receives content from the pub-sub service. The actual content received will be determined by the subscription and the message selection process.

The pub-sub service acts as both a subscription manager and a content distribution agent. Applications implementing the pub-sub service role accept subscription requests from subscribers and, subject to any applicable authentication or access control policies, accept or reject subscription requests; and distribute content to valid subscribers. An application implementing the pub-sub service role may itself act as a subscriber, subscribing to content through another instance of the pub-sub service and receiving messages from that service.

Currently, if subscriber a' 125 in data distribution network B 103 wishes to receive content from publisher c 123 in data distribution network A 101, then subscriber a' 125 must subscribe to the pub-sub service A 107 which authenticates that subscriber a' 125 has the rights to the content.

There is a need for a system that does not require a single administrative domain for identity management and authentication.

There is a need for a system that does not require a global repository of feeds across all distribution networks.

There is a need for a system that allows for the same or completely different access policies to data feeds for each distribution network.

SUMMARY

A system of one or more computers or processors can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect of the operations to be performed by a computer includes a method including: creating a first data feed in a first data feed management subsystem associated with a first data distribution network, creating a second data feed related to the first data feed in a second data feed management subsystem associated with a second data distribution network, associating a first data access policy with the second data feed, creating a publisher for the second data feed in the second data distribution network, and managing identity and authentication of a second subscriber to the second data feed in the second data distribution network by referencing the first data access policy. Other embodiments of this aspect include corresponding computer systems, apparatus, and computer programs recorded on one or more computer storage devices, each configured to perform the actions of the methods.

One general aspect includes a system including: a first data distribution network including a first data movement subsystem, a first identity management and authentication subsystem, a first policy engine and a first data feed management subsystem. The system also includes a second data distribution network including a second data movement subsystem, a second identity management and authentication subsystem, a second policy engine and a second data feed management subsystem. The system also includes a processor that executes instructions to perform operations, the operations including: creating a first data feed in a first data feed management subsystem associated with a first data distribution network; creating a second data feed related to the first data feed in a second data feed management subsystem associated with a second data distribution network; associating a first data access policy with the second data feed; creating a publisher for the second data feed in the second data distribution network. The system also includes managing identity and authentication of a second subscriber to the second data feed in the second data distribution network by referencing the first data access policy. Other embodiments of this aspect include corresponding computer systems, apparatus, and computer programs recorded on one or more computer storage devices, each configured to perform the actions of the methods.

One general aspect includes a computer-readable device including instructions, which, when loaded and executed by a processor, cause the processor to perform operations, the operations including: creating a first data feed in a first data feed management subsystem associated with a first data distribution network; creating a second data feed related to the first data feed in a second data feed management subsystem associated with a second data distribution network; associating a first data access policy with the second data feed; creating a publisher for the second data feed in the second data distribution network; and managing identity and authentication of a second subscriber to the second data feed in the second data distribution network by referencing the first data access policy. Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 5 is a flow chart for a method for federated data distribution in accordance with one embodiment.

DETAILED DESCRIPTION OF ILLUSTRATIVE EMBODIMENTS

Figure 1:
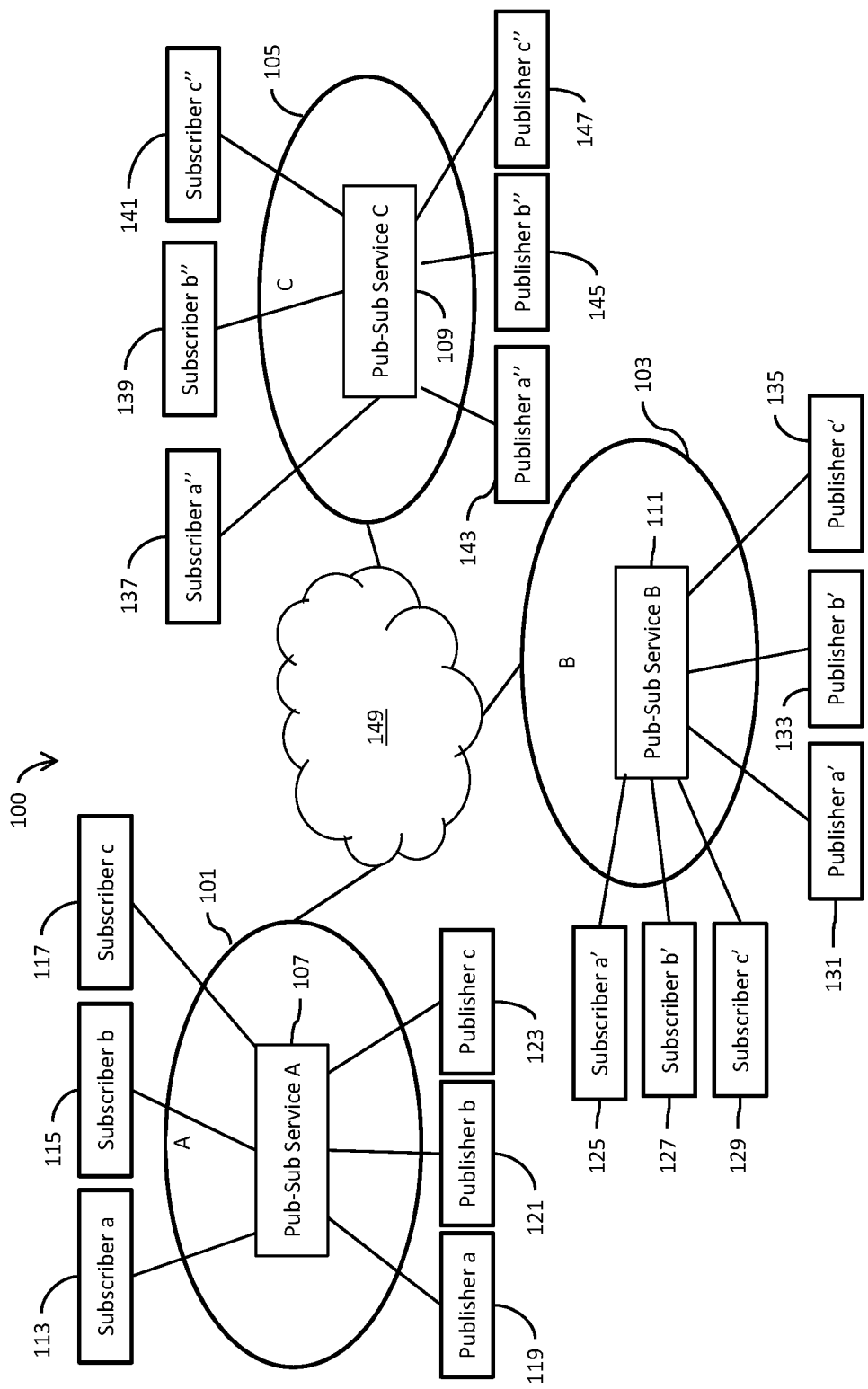
FIG. 1 is a block diagram of a typical pub-sub environment.
Figure 2:
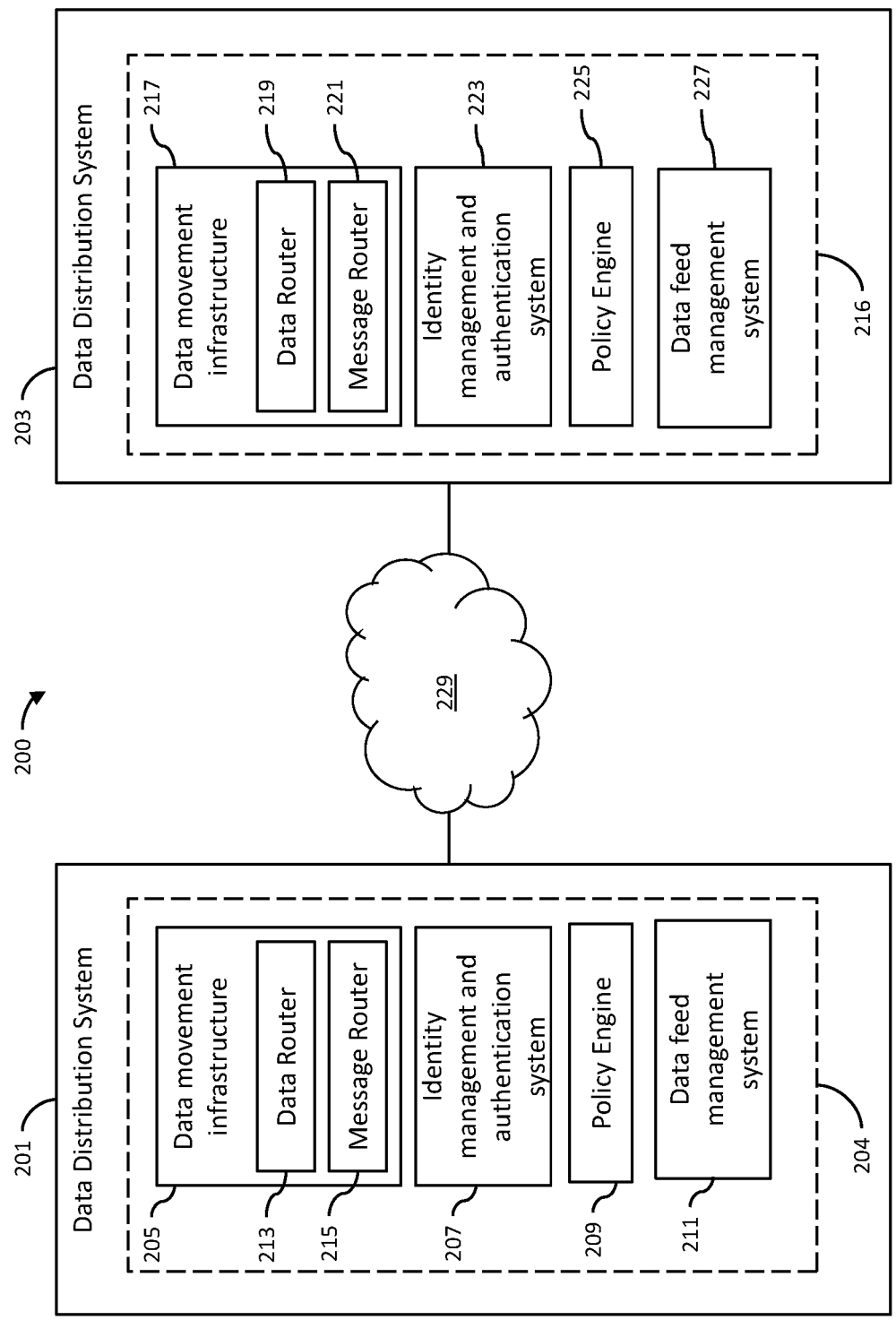
FIG. 2 is a block diagram of the components of the federated data distribution network in accordance with one embodiment.

Illustrated in FIG. 2 is an illustrative embodiment of system 200 for data distribution using a publication subscriber model with the federation of trusted data distribution networks. The system 200 includes a plurality of data distribution networks of which two are illustrated in FIG. 2, data distribution system 201 and data distribution system 203.

Data distribution system 201 includes a data distribution service 204 including data movement infrastructure 205, and identity management and authentication subsystem 207, a policy engine 209 and a data feed management subsystem 211.

The data movement infrastructure 205 is a collection of networked data brokers that transport data from publishers to subscribers in the pub-sub system. The data movement servers must ensure that only authorized publishers (as specified by the data feed management system and identity management and authentication), are allowed to place data on a feed. It must also ensure that only authorized subscribers (also specified by the data feed and identity management systems) receive the published data. The data movement infrastructure 205 may include a data router 213 and a message router 215. In one embodiment, the data router 213 uses HTTP Basic Authentication; the Message Router uses the AAF service.

The identity management and authentication subsystem 207 provides the means by which publishers and subscribers authenticate with the data movement infrastructure. The identity management and authentication subsystem 207 must provide a method of ensuring that a publisher or subscriber is who they say they are.

The policy engine 209 is an automated decision system for determining what actions an individual, a publisher, or a subscriber, is allowed to take with respect to the feed management system. Policies may be applied to all feeds, a subset of feeds, or a single feed, depending on the needs of the data provider, and typically specify whether a given authenticated ID is allowed to modify a feed, publish to that feed, or subscribe to the feed. The policy engine 209 must be able to correctly combine multiple policies from different sources to ensure compliance across policy providers. In one embodiment a XACML ABAC policy engine implementation may be used across both the data router 213 and message router 215 in the data movement infrastructure 205.

The purpose of the data feed management subsystem 211 is to keep track of the provisioned feeds and all of the publishers and subscribers to those feeds. The data feed management subsystem 211 must accept requests to create and modify feeds, add publishers, and add subscribers. It must consult with the policy engine 209 to determine whether or not to fulfill those requests, and must communicate the access mechanisms for a feed back to the requestor if the request is fulfilled. In one embodiment there are different data feed management systems for each administrative domain.

Data distribution system 203 includes a data distribution service 216 that includes a data movement infrastructure 217 having a data router 219 and a message router 221. Data distribution system 203 also includes an identity management and authentication subsystem 223, policy engine 225 and a data feed management system 227.

Federation of system 200 is accomplished by treating an entire data distribution network (e.g. data distribution system 201) as either a publisher or subscriber to a feed in another data distribution network (e.g. data distribution system 203). Consider two data distribution systems (data distribution system 201 and data distribution system 203), where data distribution system 201 contains a data feed (F) needed by subscribers in data distribution system 203.

Figure 3:
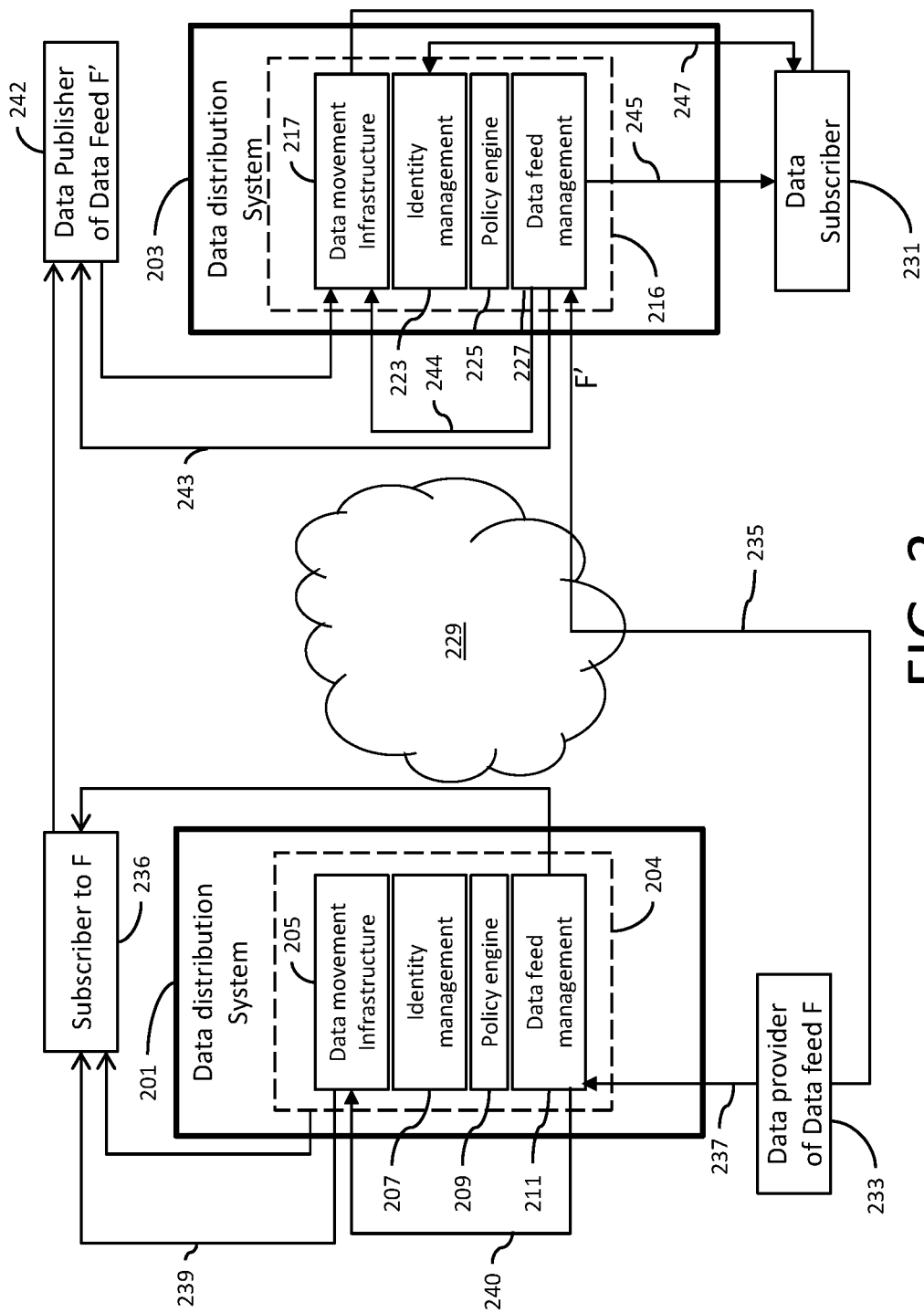
FIG. 3 is a block diagram that illustrates an embodiment of a process of federation.

The federation of system 200 is illustrated in FIG. 3. In this example, data subscriber 231 desires to subscribe to a data feed provided by data provider 233. Subscription to the data feed provided by data provider 233 is accomplished as follows:

1. The data provider 233 of a data feed F, or an authorized delegate, creates a related feed F' in the data feed management system 227 of data distribution system 203. This step is illustrated by arrow 235. Data feed F' may be identical to data feed F.

2. The data provider 233 associates a data access policy P with F'.
3. The data provider 233 accesses the data feed management subsystem 211 (arrow 237) and creates a subscriber 236 (referring to data movement infrastructure 217) to F in the data distribution system 201 (arrow 239).
4. The data feed management 211 forwards information about subscriber 236 to the data movement infrastructure 205 (arrow 240)
5. The data provider 233 accesses the data feed management subsystem 227 (arrow 235) and creates a publisher 242 of data feed F' (referring to Data movement Infrastructure 205) in the data distribution system 203 (arrow 243).
6. The Data feed management 227 forwards information about publisher 242 to Data movement infrastructure 217 (arrow 244).
7. Data subscriber 231 uses the data feed management system 227 of data distribution system 203 to subscribe to feed F'. This is illustrated by arrow 245.
8. Access control is provided by identity management and authentication subsystem 223 (arrow 247). The data access policy P, combined with existing policies in B are applied to determine if access to data feed F' is allowed. The result is that the only network connectivity that must be ensured is between data movement infrastructure 205 and data movement infrastructure 217, not each individual subscriber, and data subscriber 231 requires no additional connectivity whether its receiving data from data distribution system 201 or data distribution system 203.

Figure 4:
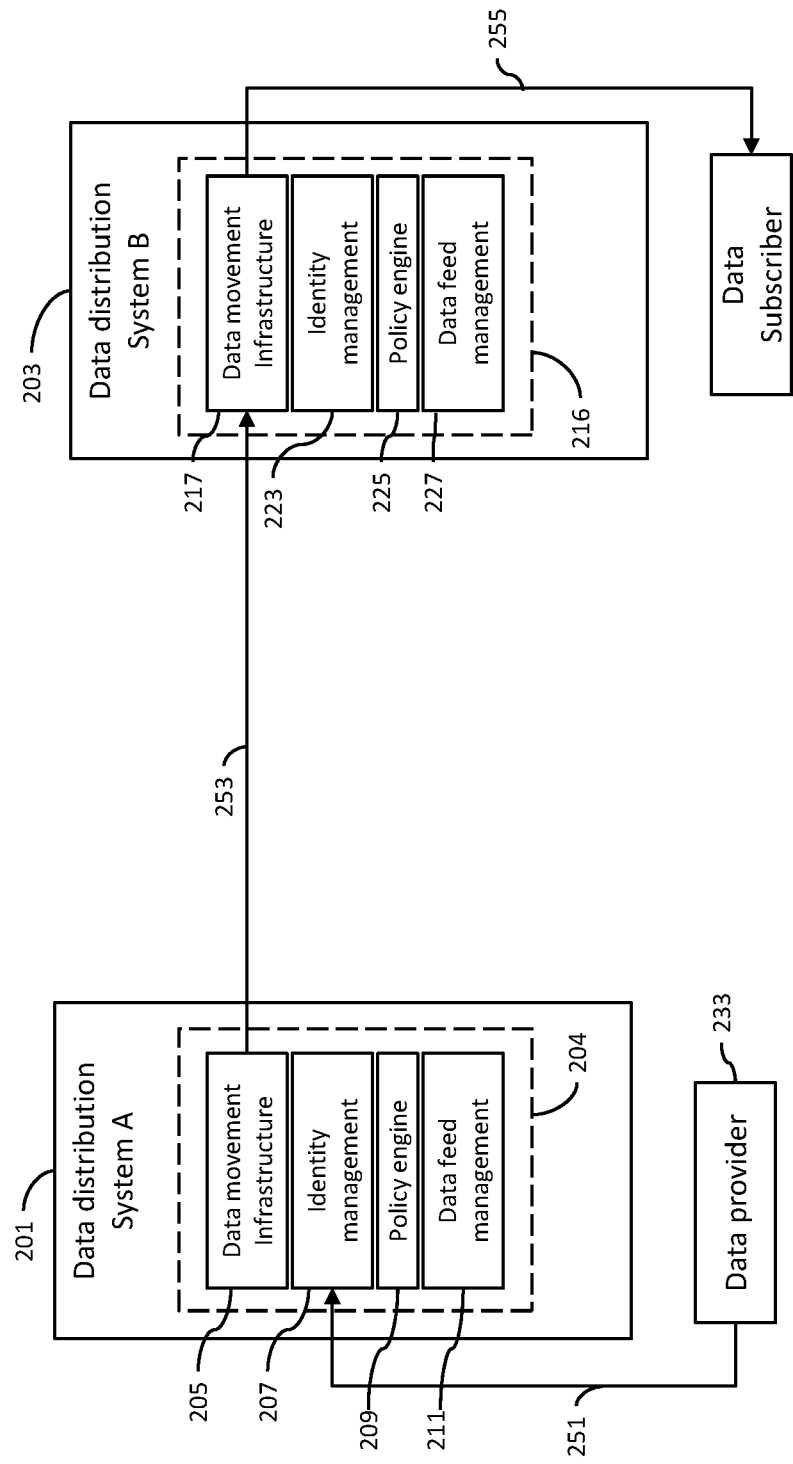
FIG. 4 is a block diagram.

FIG. 4 illustrates the data flow that allows data subscriber 231 to access the data feed from data provider 233. The data flow that allows data subscriber 231 to access the data feed from data provider 233 is as follows, the numbers in each link correspond to the number of the steps below:

1. An authorized publisher (data provider 233) in data distribution system 201 publishes data on a feed F.
2. The data distribution system 201 will authenticate data provider 233 using the authentication mechanism in data distribution system 201 and validate access with the data feed management subsystem 211 (arrow 251).
3. The data movement infrastructure 205 transports the published data to all subscribers in data distribution system 201, including the routing to data movement infrastructure 217, which appears to be as any other data subscriber (arrow 253).
4. The data movement infrastructure 217 in data distribution system B 203 transports the published data to all subscribers in B, including subscriber 231 (arrow 255).

The embodiment of system 200 described above has a number of advantages. First, the system 200 does not require a single administrative domain for identity management and authentication. Second, the system 200 does not require a global repository of feeds across all distribution networks. Additionally the system 200 allows for the same or completely different access policies to data feeds for each distribution network.

Illustrated in FIG. 4 is a flowchart for a method 300 for data distribution using a publication subscriber model with a federation of trusted data distribution networks.

In step 301, the method 300 creates a data feed F in a first data distribution network. This step may be responsive to a request for access to data feed F from a subscriber in the second data distribution network.

In step 303, the method 300 creates a data feed F' (related or identical to data feed F) in a data feed management system of a second data distribution network.

In step 305, the method 300 associates an access policy P1 with the data feed F'. The association of an access policy P1 with the data feed F prime may be accomplished by accessing a policy engine that determines what actions of individual, publisher, or a subscriber, is allowed to take with respect to the first day of feed management subsystem.

In step 307, the method 300 creates a publisher for data feed F' in the second data distribution network. This may be accomplished by creating a first subscriber to data feed F in a data feed management subsystem of the first distribution network, routing the first subscriber to the second data distribution network and designating the first subscriber is a publisher for feed F'.

In step 309, the method 300 manages the identity and authentication of subscribers to data feed F' in the second data distribution network by referencing access policy P1.

An aspect of the invention is implemented as a program product for use with a computer system. Program(s) of the program product defines functions of embodiments and can be contained on a variety of machine-readable media, which include, but are not limited to: (i) information permanently stored on computer readable devices including non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed:

1. A method comprising:
receiving a first data feed from a data provider in a first data distribution network;
sending instructions to create a second data feed related to the first data feed in a second data feed management subsystem in a second data distribution network;
associating an action policy with the second data feed, the action policy specifying whether a given authenticated ID is allowed to modify the second data feed that is related to the first data feed and that will be made accessible via a publisher to a plurality of subscribers;
creating a first data subscriber to the first data feed in a first data feed management subsystem in the first data distribution network;
creating the publisher for the second data feed in the second data distribution network, wherein the publisher is accessible to the plurality of subscribers in the second data distribution network, and wherein the creating the publisher for the second data feed comprises:
routing the first data subscriber to the second data distribution network; and designating the first data subscriber as the publisher for the second data feed; and subscribing a second data subscriber of the plurality of subscribers to the second data feed, wherein managing identity and authentication of the second data subscriber to access the second data feed in the second data distribution network is by referencing the action policy.

2. The method of claim 1, further comprising receiving a request for access to the second data feed from the second data subscriber in the second data distribution network.

3. The method of claim 1, wherein the associating the action policy comprises accessing a policy engine to determine what actions an entity is allowed to take with respect to the second data feed management subsystem.

4. The method of claim 1, wherein the second data feed is identical to the first data feed.

5. The method of claim 1, wherein the associating the action policy with the second data feed comprises accessing a policy engine that determines what actions an entity is allowed to take with respect to the first data feed management subsystem.

6. A system comprising:
a first data distribution network comprising:
a first data movement infrastructure;
a first identity management and authentication subsystem;
a first policy engine; and
a first data feed management subsystem;
a second data distribution network comprising:
a second data movement infrastructure;
a second identity management and authentication subsystem;
a second policy engine; and
a second data feed management subsystem; and
a processor, coupled to a memory, that executes executable instructions to perform operations, the operations comprising:
receiving a first data feed from a data provider in the first data distribution network;
sending instructions to create a second data feed related to the first data feed in the second data feed management subsystem;
associating an action policy with the second data feed, the action policy specifying whether a given authenticated ID is allowed to modify the second data feed that is related to the first data feed and that will be made accessible via a publisher to a plurality of subscribers;
creating a first data subscriber to the first data feed in the first data distribution network;
creating the publisher for the second data feed in the second data distribution network, wherein the publisher is accessible to the plurality of subscribers in the second data distribution network, and wherein the creating the publisher for the second data feed comprises:
routing the first data subscriber to the second data distribution network; and
designating the first data subscriber as the publisher for the second data feed; and
subscribing a second data subscriber of the plurality of subscribers to the second data feed, wherein managing identity and authentication of the second data subscriber to access the second data feed in the second data distribution network is by referencing the action policy.

7. The system of claim 6, wherein the operations further comprise receiving a request for access to the second data feed from the second data subscriber in the second data distribution network.

8. The system of claim 7, wherein the associating the action policy comprises determining what actions an entity is allowed to take with respect to the second data feed management subsystem.

9. The system of claim 8, wherein the associating the action policy comprises accessing a policy engine to determine what actions the entity is allowed to take with respect to the second data feed management subsystem.

10. The system of claim 6, wherein the operations further comprise authenticating the second data subscriber.

11. The system of claim 6, wherein the associating the action policy with the second data feed comprises accessing a policy engine that determines what actions an entity is allowed to take with respect to the first data feed management subsystem.

12. The system of claim 6, wherein the executable instructions are on a read-only memory device.

13. The system of claim 6, wherein the executable instructions are on a CD-ROM disk or a DVD-ROM disk.

14. The system of claim 6, wherein the executable instructions are on a hard disk drive.

15. A non-transitory computer-readable storage medium having computer-executable instructions that, when executed, cause a computer system to:
receive a first data feed from a data provider in a first data distribution network;
send instructions to create a second data feed related to the first data feed in a second data feed management subsystem in a second data distribution network;
associate an action policy with the second data feed, the action policy specifying whether a given authenticated ID is allowed to modify the second data feed that is related to the first data feed and that will be made accessible via a publisher to a plurality of subscribers;
create a first data subscriber to the first data feed in the first data distribution network;
create the publisher for the second data feed in the second data distribution network, wherein the publisher is accessible to the plurality of subscribers in the second data distribution network, and wherein creation of the publisher for the second data feed comprises:
routing the first data subscriber to the second data distribution network; and
designating the first data subscriber as the publisher for the second data feed; and
subscribe a second data subscriber of the plurality of subscribers to the second data feed, wherein managing identity and authentication of the second data subscriber to access the second data feed in the second data distribution network is by referencing the action policy.

16. The non-transitory computer-readable storage medium of claim 15, further comprising instructions that, when executed, cause the computer system to receive a request for access to the second data feed from the second data subscriber in the second data distribution network.

17. The non-transitory computer-readable storage medium of claim 15, wherein associating the action policy comprises accessing a policy engine to determine what actions an entity is allowed to take with respect to the second data feed management subsystem.

18. The non-transitory computer-readable storage medium of claim 15, wherein the non-transitory computer-readable storage medium comprises a read-only memory device.

19. The non-transitory computer-readable storage medium of claim 15, wherein the non-transitory computer-readable storage medium comprises a CD-ROM disk or a DVD-ROM disk.

20. The non-transitory computer-readable storage medium of claim 15, wherein the non-transitory computer-readable storage medium comprises on a hard disk drive.

\* \* \* \* \*